(12) United States Patent
Yang et al.

(10) Patent No.: US 11,130,771 B2
(45) Date of Patent: Sep. 28, 2021

(54) PRODRUGS OF NALTREXONE, NALMEFENE AND DERIVATIVES THEREOF

(71) Applicant: TAIWANJ PHARMACEUTICALS CO., LTD., Zhubei (TW)

(72) Inventors: Syaulan S. Yang, Zhubei (TW); Kuang Yuan Lee, Hsinchu (TW); Yan-Feng Jiang, Kaohsiung (TW)

(73) Assignee: TAIWANJ PHARMACEUTICALS CO., LTD., Zhubei (TW)

( * ) Notice: Subject to any disclaimer, the term of this patent is extended or adjusted under 35 U.S.C. 154(b) by 0 days.

(21) Appl. No.: 17/253,939

(22) PCT Filed: Jun. 20, 2019

(86) PCT No.: PCT/US2019/038160
§ 371 (c)(1),
(2) Date: Dec. 18, 2020

(87) PCT Pub. No.: WO2019/246353
PCT Pub. Date: Dec. 26, 2019

(65) Prior Publication Data
US 2021/0261579 A1      Aug. 26, 2021

Related U.S. Application Data

(60) Provisional application No. 62/688,025, filed on Jun. 21, 2018.

(51) Int. Cl.
*C07F 9/24* (2006.01)
(52) U.S. Cl.
CPC .................. *C07F 9/2404* (2013.01)
(58) Field of Classification Search
CPC .................................... C07F 9/2404

USPC ......................................... 514/137
See application file for complete search history.

(56) References Cited

U.S. PATENT DOCUMENTS

| 2011/0034502 A1 | 2/2011 | Guillaume et al. |
| 2011/0053971 A1 | 3/2011 | Guillaume et al. |
| 2014/0178463 A1 | 6/2014 | Cohen et al. |

OTHER PUBLICATIONS

International Search Report, issued in PCT/US2019/038160, dated Aug. 22, 2019.
Written Opinion of the International Searching Authority, issued in PCT/US2019/038160, dated Aug. 22, 2019.

*Primary Examiner* — Kristin A Vajda
(74) *Attorney, Agent, or Firm* — Birch, Stewart, Kolasch & Birch, LLP (57) ABSTRACT

A novel structure of an opioid antagonist is provided. One of the exemplary compounds of the present disclosure has the structure of Formula (II). The present disclosure overcomes the discomfort of conventional opioid antagonist due to rapid absorption and improves the patient compliance thereof.

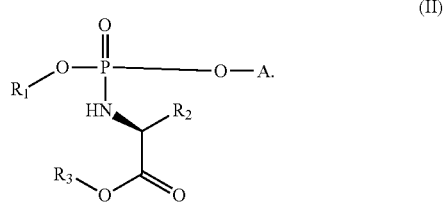

16 Claims, 2 Drawing Sheets

PRODRUGS OF NALTREXONE, NALMEFENE AND DERIVATIVES THEREOF

CROSS REFERENCE TO RELATED APPLICATIONS

This application is the National Phase of PCT International Application No. PCT/US2019/038160, filed on Jun. 20, 2019, which claims priority under 35 U.S.C. 119(e) to U.S. Provisional Application No. 62/688,025, filed on Jun. 21, 2018, all of which are hereby expressly incorporated by reference into the present application.

BACKGROUND

The disclosure relates in general to prodrugs of opioid antagonists and the derivatives thereof; particularly to prodrugs of Naltrexone, Nalmefene and the derivatives thereof.

Naltrexone and Nalmefene are commonly used opioid antagonist drugs for treating alcohol dependence and opioid dependence. Both of the two compounds bind to the opioid receptors with high affinity but not activate the receptors. In other words, Naltrexone and Nalmefene bind to the opioid receptors and occupy the receptor from responding to opioids and endorphins

Despite that Naltrexone and Nalmefene are commonly used in clinical treatment of alcohol dependence and opioid dependence, their rapid absorption property through oral administration is a long-time problem as causing discomfort to the patients.

In order to improve patient compliance of Naltrexone and Nalmefene, the aforesaid discomforts resulting from rapid absorption shall be duly addressed. Thus, a novel prodrug or composition to alleviate the rapid and high absorption phenomena for the aforementioned opioid receptor antagonist is needed.

SUMMARY

The disclosure is directed to prodrugs of Naltrexone, Nalmefene and the derivatives thereof.

According to one embodiment, a compound according to formula (I), or a geometric isomer, enantiomer, diastereomer, racemate, atropisomer, pharmaceutically acceptable salt, prodrug and solvate thereof are provided.

(I)

$X$ is $CH_2$ or oxygen; $R_1$, $R_2$ or $R_3$ is independently selected from the group consisting of H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl and $C_1$-$C_{20}$ heteroaryl; $R_1$, $R_2$ or $R_3$ is, independently, optionally substituted with one or more halogen, hydroxy, alkoxyl, CN, $N_3$, $N(R^a)(R^b)$, $C(O)N(R^a)(R^b)$, $N(R^a)C(O)N(R^b)(R^c)$, $N(R^a)C(O)OR^b$, $OC(O)N(R^a)(R^b)$, $C(O)OR^a$, $OC(O)OR^a$, $C(O)R^a$, $OC(O)R^a$, $S(O)_nR^a$, $S(O)_2N(R^a)(R^b)$ or $N(R^a)S(O)_2N(R^b)(R^c)$; $R^a$, $R^b$ or $R^c$ is independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl; and n=1, 2, or 3.

According to another embodiment, a compound according to formula (II), pharmaceutically acceptable salt, prodrug and solvate thereof are provided.

(II)

A has the following structure:

$X$ is $CH_2$ or oxygen; $R_1$, $R_2$ or $R_3$ is independently selected from the group consisting of H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl and $C_1$-$C_{20}$ heteroaryl; $R_1$, $R_2$ or $R_3$ is, independently, optionally substituted with one or more halogen, hydroxy, alkoxyl, CN, $N_3$, $N(R^a)(R^b)$, $C(O)N(R^a)(R^b)$, $N(R^a)C(O)N(R^b)(R^c)$, $N(R^a)C(O)OR^b$, $OC(O)N(R^a)(R^b)$, $C(O)OR^a$, $OC(O)OR^a$, $C(O)R^a$, $OC(O)R^a$, $S(O)_nR^a$, $S(O)_2N(R^a)(R^b)$ or $N(R^a)S(O)_2N(R^b)(R^c)$; $R^a$, $R^b$ or $R^c$ is independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl; n=1, 2, or 3; $R_4$ is H, methyl, allyl, or cyclopropyl methyl; and $R_5$ is H or OH.

According to an alternative embodiment, a pharmaceutical composition is provided. The pharmaceutical composition comprises the compound according to formula (I) or (II) and at least one pharmaceutically acceptable carrier or excipient.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The foregoing and other aspects of the present disclosure will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process, or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

All of the carbon, hydrogen, oxygen, Sulfur, halogen, or nitrogen involved in the groups and compounds according to the present disclosure are optionally further replaced by one or more of their corresponding isotopes, wherein the carbon isotopes include $^{12}C$, $^{13}C$ and $^{14}C$, the hydrogen isotopes include protium (H), deuterium (D, also known as heavy hydrogen) and tritium (T, also known as Superheavy hydrogen), the oxygen isotopes include $^{16}O$, $^{17}O$ and $^{18}O$, the sulfur isotopes include $^{32}S$, $^{33}S$, $^{34}S$ and $^{36}S$, the nitrogen isotopes include $^{14}N$ and $^{15}N$, the fluorine isotopes include $^{17}F$ and $^{19}F$, the chlorine isotopes include $^{35}Cl$ and $^{37}Cl$, and the bromine isotopes include $^{79}Br$ and $^{81}Br$.

"Alkyl" means a linear or branched saturated aliphatic hydrocarbyl having 1 to 20 carbon atoms, preferably 1 to 10 carbon atoms. Non-limiting examples thereof include methyl, ethyl, n-propyl, isopropyl. n-butyl, sec-butyl, t-butyl, isobutyl, n-pentyl, isopentyl, neo-pentyl, n-hexyl, octyl, and various branched isomers thereof.

"Alkoxy" means —O-alkyl. Non-limiting examples thereof include methoxy, ethoxy, n-propoxy, isopropoxy, n-butoxy, sec-butoxy, t-butoxy, n-pentyloxy, n-hexyloxy, cyclopropoxy, and cyclobutoxy. This definition applies to the alkoxys used throughout this Description.

"Alkenyl" means a linear or branched unsaturated aliphatic hydrocarbyl having at least one carbon-carbon double bonds, and comprising 2 to 20 carbon atoms, preferably 2 to 8. Non limiting examples thereof include vinyl, propen-2-yl, buten2-yl, buten-2-yl, penten-2-yl, penten-4-yl, hexen-2-yl, hexen3-yl, hepten-2-yl, hepten-3-yl, hepten-4-yl, octen-3-yl, nonen-3-yl, decen-4-yl and hendecen-3-yl. "Alkenyl" can also include polyenes such as 1,2 propadienyl and 2,4 hexadienyl.

"Alkynyl" means a linear or branched unsaturated aliphatic hydrocarbyl having at least one carbon-carbon triple bonds, and comprising 2 to 20 carbon atoms, preferably 2 to 8 carbon atoms. Non limiting examples thereof include ethynyl, propyn-1-yl, propyn-2-yl, butyn-1-yl, butyn-2-yl, butyn-3-yl, 3.3-dimethylbutyn-2-yl, pentyn-1-yl, pentyn-2-yl, hexyn-1-yl, heptyn-1-yl, heptyn-3-yl, heptyn-4-yl, octyn-3-yl, nonyn-3-yl, decyn4-yl, hendecyn-3-yl or dodecyn-4-yl. "Alkynyl" can also include moieties comprised of multiple triple bonds such as 2,5 hexadiynyl.

"Aromatic" indicates that each of the ring atoms is essentially in the same plane and has a p-orbital perpendicular to the ring plane, and that (4n+2) π electrons, where n is a positive integer, are associated with the ring to comply with Hückel's rule. The term "aromatic ring or ring system" denotes a carbocyclic or heterocyclic ring or ring system in which the ring or at least one ring of the ring system is aromatic. The term "aromatic ring or ring system" is also referred to as "aryl". "Aryl" might include 6 to 20 carbons as ring member including phenyl, benzyl, naphthyl, and the like. Aryl can also include substituted aryl groups such as tolyl. The term "aromatic heterocyclic ring system" denotes a heterocyclic ring system in which at least one ring of the ring system is aromatic. The term "aromatic heterocyclic ring system" is also referred to as "heteroaryl". "Heteroaryl" might include 1 to 20 carbons as ring member and might further include at least one heteroatom selected from S, N, and 0.

"Carbocyclyl" means a saturated or unsaturated aromatic or non-aromatic ring, and the aromatic or non-aromatic ring may be a 3- to 8-membered monocyclic, a 4- to 12-membered bicyclic or a 10- to 20-membered tricyclic system. The carbocyclic group may have attached bridge rings or spiral rings. Non-limiting examples thereof include cyclopropyl, cyclobutyl, cyclopentyl, cyclohexyl, cycloheptyl, cyclooctyl, cyclodecyl and cyclododecyl, cyclohexenyl, This definition applies to the carbocyclyls used throughout this Description.

"Heterocyclyl" means a substituted or unsubstituted, saturated or unsaturated, aromatic or non-aromatic ring, and the aromatic or non-aromatic ring may be a 1 to 8-membered monocyclic, a 4- to 12-membered bicyclic or a 10- to 20-membered tricyclic system, and contains at least one heteroatom selected from N, O or S. The optionally substituted N, O or S on the ring of a heterocyclic group may be oxidized into various oxidation States. The carbocyclic group may be attached via a heteroatom or a carbon atom, and may have attached bridge rings or spiral rings. Non-limiting examples thereof include epoxyethyl, azacyclopropyl, oxzcyclobutyl, azacyclobutyl, 1,3-dioxolane, 1,4-dioxolane, 1,3-dioxane, azacycloheptyl, pyridinyl, furyl, thiophenyl, pyranyl, N-alkylpyrrolyl, pyrimidinyl, pyrazinyl, pyridazinyl, imidazolyl, piperidinyl, hexahydropyridinyl, morpholinyl, thiomorpholinyl, 1,3-dithia-, dihydrofuryl, dihydropyranyl, dithiacyclopentyl, tetrahydrofuryl, tetrahydropyrrolyl, tetrahydroimidazolyl, tetrahydrothiazolyl, tetrahydropyranyl, benzimidazolyl, benzopyridinyl, pyrrolopyridinyl, benzodihydrofuryl, azabicyclo[3.2.1]octyl, azabicyclo[5.2.0]nonyl, azatricyclo[5.3.1.1]dodecyl, aza-adamantanyl, and oxaspiro[3.3]heptyl. This definition applies to the heterocyclyls used throughout this Description.

As used herein, the term "optional" or "optionally" means the event or situation modified by this term may but does not certainly happen, including both the case where the event or situation happens and the case not. As used herein, the term "optionally substituted" refers to groups which are unsubstituted or have at least one non-hydrogen substituent that does not extinguish the biological activity possessed by the unsubstituted analog. As used herein, the following definitions shall apply unless otherwise indicated. The term "optionally substituted" is used interchangeably with the phrase "substituted or unsubstituted" or with the term "(un)substituted." Unless otherwise indicated, an optionally substituted group may have a substituent at each substitutable position of the group, and each substitution is independent of the other. For example, "a heterocyclyl optionally substituted with alkyl" means that the alkyl may be present but is not necessarily present, including both the case where the heterocyclyl is substituted with alkyl and the case where the heterocyclyl is not substituted with alkyl.

As used herein, a "pharmaceutically acceptable" component (such as a carrier or excipient) means that the compound or composition is suitable for administration to a subject to achieve the treatments described herein, without unduly deleterious side effects in light of the severity of the disease and necessity of the treatment. "Carrier" means a material that does not cause significant stimulation to an organism and does not eliminate the biological activity and characteristics of a given compound. "Excipient" means an inert substance added into a pharmaceutical composition to facilitate administration of a compound. Non-limiting examples thereof include calcium carbonate, calcium phosphate, sugar, starch, cellulose derivatives (including microcrystalline cellulose), gelatin, vegetable oils, polyethylene glycols, diluent, a granulating agent, lubricant, binder and disintegrant.

A "prodrug" means a compound that can be converted upon in vivo metabolism into the biologically active compound of the present disclosure. A prodrug of the present disclosure is prepared by modification of the phosphate group of the compound of the present disclosure. Such a modification can be removed in vivo or by conventional operations, so as to afford the parent compound. When a prodrug of the present disclosure is administered to a mammalian individual, it is cleaved to expose a free hydroxyl.

A "stereoisomer" refers to an isomer of a molecule having its atoms in a different spatial arrangement. Compounds of this invention can exist as one or more stereoisomers. The various stereoisomers include geometric isomers, enantiomers, diastereomers, racemates, atropisomers. One skilled in the art will appreciate that one stereoisomer may be more active and/or may exhibit beneficial effects when enriched relative to the other stereoisomer(s) or when separated from the other stereoisomer(s). Additionally, the skilled artisan knows how to separate, enrich, and/or to selectively prepare said stereoisomers. The compounds of the invention may be present as a mixture of stereoisomers, individual stereoisomers or as an optically active form.

As noted above, naltrexone and nalmefene are well documented compounds and commercially available. Other compounds of use in the present disclosure may be obtained by modification of naltrexone or nalmefene by routine chemical methods or by use of techniques analogous to those described in PCT Publication WO 03/097608.

In one aspect of the present disclosure, a novel compound is provided. The compound of the present disclosure could be described as structural formula (I) and (II) as follows:

The left part of the aforesaid structures is a specific phosphate moiety, and the right part of it is a biologically active component—an opioid antagonist. The left part of the aforesaid structures includes three main substitutes: $R_1$, $R_2$ and $R_3$, which are independently selected from the group consisting of H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl and $C_1$-$C_{20}$ heteroaryl.

Preferably, $R_1$, $R_2$ or $R_3$ can be independently and optionally substituted with one or more halogen, hydroxy, alkoxyl, CN, $N_3$, $N(R^a)(R^b)$, $C(O)N(R^a)(R^b)$, $N(R^a)C(O)N(R^b)(R^c)$, $N(R^a)C(O)OR^b$, $OC(O)N(R^a)(R^b)$, $C(O)OR^a$, $OC(O)OR^a$, $C(O)R^a$, $OC(O)R^a$, $S(O)_nR^a$, $S(O)_2N(R^a)(R^b)$ or $N(R^a)S(O)_2N(R^b)(R^c)$, wherein $R^a$, $R^b$ or $R^c$ can be independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl and n can be 1, 2, or 3.

In a preferably embodiment, $R_2$, $R_3$ and the adjacent peptide bond together can be a moiety (see following formula (III)) derived from an amino acid including but not limited to Alanine, Arginine, Asparagine, Aspartic acid, Cysteine, Glutamic acid, Glutamine, Glycine, Histidine, Isoleucine, Leucine, Lysine, Methionine, Phenylalanine, Proline, Serine, Threonine, Tryptophan, Tyrosine and Valine. That is, case in point, $R_3$ is H and $R_2$ can be H (Glycine), methyl (Alanine), isopropyl (Valine), isobutyl (Leucine), 2-butyl (Isoleucine), and benzyl (Phenylalanine).

(III)

In another aspect of the present disclosure, a pharmaceutical composition comprising the compound of the present disclosure is provided. The pharmaceutical composition can be formulated to any form of formulation that is considered to be safe, effective, and convenient for use. In a preferable embodiment, said pharmaceutical composition is formulated as an oral formulation. Preferably, the pharmaceutical composition might further comprise a pharmaceutically acceptable component as defined in the previous paragraphs. A usable pharmaceutically acceptable carrier, or excipient are disclosed in various references including *Handbook of Pharmaceuticals Excipients* edited by Raymond C Rowe, Paul J Sheskey, and Marian E Quinn. In a unlimited embodiment, said pharmaceutically acceptable carrier, or excipient can be selected from the group consisting of inert diluents, dispersing and/or granulating agents, surface active agents and/or emulsifiers, disintegrating agents, binding agents, preservatives, buffering agents, lubricating agents, and/or oils, said compositions optionally further comprising at least one additional biologically active compound or agent.

The pharmaceutical composition might comprise but not limited to a single unit dose of the active ingredient (for instance, the compound of the present disclosure). For purposes of treatment, a dose unit can be in the form of a discrete article such as but not limited to a tablet or capsule, or can be a measurable volume of a solution, suspension or the like containing a unit dose of the active ingredient. The term "unit dose" herein refers to an amount of active ingredient intended for a single but not limited to oral, intravenous, intramuscular, cutaneous, subcutaneous, intrathecal, transdermal, implantation, sublingual, buccal, rectal, vaginal, ocular, otic, nasal, inhalation, or nebulization administration to a subject for treatment such as but not limited to alcohol dependence, opioid dependence, pain relief, or other diseases. The treatment may require periodic administration of unit doses of the compound of the present disclosure, for example one unit dose two or more times a day, one unit dose with each meal, one unit dose every four hours or other interval, or only one unit dose per day.

Embodiments of the present disclosure as described in the Summary include those described below. In the following Embodiments, reference to the compound of the present disclosure includes the definitions of substituents specified in the Summary of the Invention unless further defined in the Embodiments.

Embodiment 1: A compound of Formula (I); wherein $R_1$ is H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl or $C_1$-$C_{20}$ heteroaryl.

Embodiment 2: A compound of Formula (I); wherein $R_1$ is H, $C_1$-$C_{20}$ alkyl, $C_2$-$C_{20}$ alkenyl, or $C_2$-$C_{20}$ alkynyl.

Embodiment 3: A compound of Formula (I); wherein $R_1$ is H, $C_1$-$C_{20}$ alkyl, or $C_2$-$C_{20}$ alkenyl.

Embodiment 4: A compound of Formula (I); wherein $R_1$ is H, $C_1$-$C_{20}$ alkyl, or $C_2$-$C_{20}$ alkynyl.

Embodiment 5: A compound of Formula (I); wherein $R_1$ is H or $C_1$-$C_{20}$ alkyl.

Embodiment 6: A compound of Formula (I); wherein $R_1$ is H or $C_2$-$C_{20}$ alkenyl.

Embodiment 7: A compound of Formula (I); wherein $R_1$ is H or $C_2$-$C_{20}$ alkynyl.

Embodiment 8: A compound of Formula (I); wherein $R_1$ is $C_3$-$C_{20}$ carbocyclyl, $C_6$-$C_{20}$ aryl, or $C_1$-$C_{20}$ heterocyclyl.

Embodiment 9: A compound of Formula (I); wherein $R_1$ is $C_3$-$C_{20}$ carbocyclyl or $C_6$-$C_{20}$ aryl.

Embodiment 10: A compound of Formula (I); wherein $R_1$ is $C_3$-$C_{20}$ carbocyclyl or $C_1$-$C_{20}$ heterocyclyl.

Embodiment 11: A compound of Formula (I); wherein $R_1$ is $C_6$-$C_{20}$ aryl or $C_1$-$C_{20}$ heterocyclyl.

Embodiment 12: A compound of Formula (I); wherein $R_1$ is $C_3$-$C_{20}$ carbocyclyl.

Embodiment 13: A compound of Formula (I); wherein $R_1$ is $C_6$-$C_{20}$ aryl.

Embodiment 14: A compound of Formula (I); wherein $R_1$ is $C_1$-$C_{20}$ heterocyclyl.

Embodiment 15: A compound of any one of Embodiments 1-14; wherein $R_2$ is H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl or $C_1$-$C_{20}$ hetero aryl.

Embodiment 16: A compound of Embodiment 15; wherein $R_2$ is H, $C_1$-$C_{20}$ alkyl, $C_2$-$C_{20}$ alkenyl, or $C_2$-$C_{20}$ alkynyl.

Embodiment 17: A compound of Embodiment 15; wherein $R_2$ is H, $C_1$-$C_{20}$ alkyl, or $C_2$-$C_{20}$ alkenyl.

Embodiment 18: A compound of Embodiment 15; wherein $R_2$ is H, $C_1$-$C_{20}$ alkyl, or $C_2$-$C_{20}$ alkynyl.

Embodiment 19: A compound of Embodiment 15; wherein $R_2$ is H or $C_1$-$C_{20}$ alkyl.

Embodiment 20: A compound of Embodiment 15; wherein $R_2$ is H or $C_2$-$C_{20}$ alkenyl.

Embodiment 21: A compound of Embodiment 15; wherein $R_2$ is H or $C_2$-$C_{20}$ alkynyl.

Embodiment 22: A compound of Embodiment 15; wherein $R_2$ is $C_3$-$C_{20}$ carbocyclyl, $C_6$-$C_{20}$ aryl, or $C_1$-$C_{20}$ heterocyclyl.

Embodiment 23: A compound of Embodiment 15; wherein $R_2$ is $C_3$-$C_{20}$ carbocyclyl or $C_6$-$C_{20}$ aryl.

Embodiment 24: A compound of Embodiment 15; wherein $R_2$ is $C_3$-$C_{20}$ carbocyclyl or $C_1$-$C_{20}$ heterocyclyl.

Embodiment 25: A compound of Embodiment 15; wherein $R_2$ is $C_6$-$C_{20}$ aryl or $C_1$-$C_{20}$ heterocyclyl.

Embodiment 26: A compound of Embodiment 15; wherein $R_2$ is $C_3$-$C_{20}$ carbocyclyl.

Embodiment 27: A compound of Embodiment 15; wherein $R_2$ is $C_6$-$C_{20}$ aryl.

Embodiment 28: A compound of Embodiment 15; wherein $R_2$ is $C_1$-$C_{20}$ heterocyclyl.

Embodiment 29: A compound of any one of Embodiments 1-28; wherein $R_3$ is H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl or $C_1$-$C_{20}$ hetero aryl.

Embodiment 30: A compound of Embodiment 29; wherein $R_3$ is H, $C_1$-$C_{20}$ alkyl, $C_2$-$C_{20}$ alkenyl, or $C_2$-$C_{20}$ alkynyl.

Embodiment 31: A compound of Embodiment 29; wherein $R_3$ is H, $C_1$-$C_{20}$ alkyl, or $C_2$-$C_{20}$ alkenyl.

Embodiment 32: A compound of Embodiment 29; wherein $R_3$ is H, $C_1$-$C_{20}$ alkyl, or $C_2$-$C_{20}$ alkynyl.

Embodiment 33: A compound of Embodiment 29; wherein $R_3$ is H or $C_1$-$C_{20}$ alkyl.

Embodiment 34: A compound of Embodiment 29; wherein $R_3$ is H or $C_2$-$C_{20}$ alkenyl.

Embodiment 35: A compound of Embodiment 29; wherein $R_3$ is H or $C_2$-$C_{20}$ alkynyl.

Embodiment 36: A compound of Embodiment 29; wherein $R_3$ is $C_3$-$C_{20}$ carbocyclyl, $C_6$-$C_{20}$ aryl, or $C_1$-$C_{20}$ heterocyclyl.

Embodiment 37: A compound of Embodiment 29; wherein $R_3$ is $C_3$-$C_{20}$ carbocyclyl or $C_6$-$C_{20}$ aryl.

Embodiment 38: A compound of Embodiment 29; wherein $R_3$ is $C_3$-$C_{20}$ carbocyclyl or $C_1$-$C_{20}$ heterocyclyl.

Embodiment 39: A compound of Embodiment 29; wherein $R_3$ is $C_6$-$C_{20}$ aryl or $C_1$-$C_{20}$ heterocyclyl.

Embodiment 40: A compound of Embodiment 29; wherein $R_3$ is $C_3$-$C_{20}$ carbocyclyl.

Embodiment 41: A compound of Embodiment 29; wherein $R_3$ is $C_6$-$C_{20}$ aryl.

Embodiment 42: A compound of Embodiment 29; wherein $R_3$ is $C_1$-$C_{20}$ heterocyclyl.

Embodiment 44: A compound of any one of Embodiments 1-42; wherein $R_1$ is unsubstituted.

Embodiment 45: A compound of any one of Embodiments 1-42; wherein $R_2$ is unsubstituted.

Embodiment 46: A compound of any one of Embodiments 1-42; wherein $R_3$ is unsubstituted.

Embodiment 47: A compound of any one of Embodiments 1-42; wherein $R_1$, and $R_2$ are unsubstituted.

Embodiment 48: A compound of any one of Embodiments 1-42; wherein $R_1$, and $R_3$ are unsubstituted.

Embodiment 49: A compound of any one of Embodiments 1-42; wherein $R_2$, and $R_3$ are unsubstituted.

Embodiment 50: A compound of any one of Embodiments 1-42; wherein $R_1$, $R_2$, and $R_3$ are unsubstituted.

Embodiment 51: A compound of any one of Embodiments 1-42; wherein $R_1$ is substituted with one or more halogen, hydroxy, alkoxyl, CN, $N_3$, $N(R^a)(R^b)$, $C(O)N(R^a)(R^b)$, $N(R^a)C(O)N(R^b)(R^c)$, $N(R^a)C(O)OR^b$, $OC(O)N(R^a)(R^b)$, $C(O)OR^a$, $OC(O)OR^a$, $C(O)R^a$, $OC(O)R^a$, $S(O)_nR^a$, $S(O)_2N(R^a)(R^b)$ or $N(R^a)S(O)_2N(R^b)(R^c)$; wherein $R^a$, $R^b$ or $R^c$ is independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl; and n=1, 2, or 3.

Embodiment 52: A compound of any one of Embodiments 1-42; wherein $R_2$ is substituted with one or more halogen, hydroxy, alkoxyl, CN, $N_3$, $N(R^a)(R^b)$, $C(O)N(R^a)(R^b)$, $N(R^a)C(O)N(R^b)(R^c)$, $N(R^a)C(O)OR^b$, $OC(O)N(R^a)(R^b)$, $C(O)OR^a$, $OC(O)OR^a$, $C(O)R^a$, $OC(O)R^a$, $S(O)_nR^a$, $S(O)_2N(R^a)(R^b)$ or $N(R^a)S(O)_2N(R^b)(R^c)$; wherein $R^a$, $R^b$ or $R^c$ is independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl; and n=1, 2, or 3.

Embodiment 53: A compound of any one of Embodiments 1-42; wherein $R_3$ is substituted with one or more halogen, hydroxy, alkoxyl, CN, $N_3$, $N(R^a)(R^b)$, $C(O)N(R^a)(R^b)$, $N(R^a)C(O)N(R^b)(R^c)$, $N(R^a)C(O)OR^b$, $OC(O)N(R^a)(R^b)$, $C(O)OR^a$, $OC(O)OR^a$, $C(O)R^a$, $OC(O)R^a$, $S(O)_{nR}^a$, $S(O)_2N(R^a)(R^b)$ or $N(R^a)S(O)_2N(R^b)(R^c)$; wherein $R^a$, $R^b$ or $R^c$ is independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl; and n=1, 2, or 3.

Embodiment 54: A compound of any one of Embodiments 1-53; wherein X is $CH_2$.

Embodiment 55: A compound of any one of Embodiments 1-53; wherein X is oxygen.

Embodiments of this invention, including Embodiments 1-55 above as well as any other embodiments described herein, can be combined in any manner, and the descriptions of variables in the embodiments pertain not only to the compounds of Formula I but also to the starting compounds and intermediate compounds useful for preparing the compounds of Formula I. In addition, embodiments of this invention, including Embodiments 1-68 above as well as any other embodiments described herein, and any combination thereof, pertain to the compositions and methods of the present disclosure.

Combinations of Embodiments 1-55 are illustrated by:

Embodiment A: A Formula (I) compound is disclosed; wherein

X is oxygen;

$R_1$, $R_2$ or $R_3$ is independently selected from the group consisting of H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl and $C_1$-$C_{20}$ heteroaryl;

$R_1$, $R_2$ or $R_3$ is, independently, optionally substituted with one or more halogen, hydroxy, alkoxyl, CN, $N_3$, $N(R^a)(R^b)$, $C(O)N(R^a)(R^b)$, $N(R^a)C(O)N(R^b)(R^c)$, $N(R^a)C(O)OR^b$, $OC(O)N(R^a)(R^b)$, $C(O)OR^a$, $OC(O)OR^a$, $C(O)R^a$, $OC(O)R^a$, $S(O)_nR^a$, $S(O)_2N(R^a)(R^b)$ or $N(R^a)S(O)_2N(R^b)(R^c)$;

$R^a$, $R^b$ or $R^c$ is independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl; and n=1, 2, or 3.

Embodiment A1: A compound of Embodiment A is disclosed; wherein X is oxygen; $R_1$ is phenyl, both $R_2$ and $R_3$ are methyl. Embodiment A1 compound has the following structure.

Embodiment A2: A compound of Embodiment A is disclosed; wherein X is oxygen; $R_1$ is phenyl, $R_2$ is methyl, and $R_3$ is hydrogen.

Embodiment A3: A compound of Embodiment A is disclosed; wherein X is oxygen; $R_1$ is phenyl, $R_2$ is isopropyl, and $R_3$ is hydrogen.

Embodiment A4: A compound of Embodiment A is disclosed; wherein X is oxygen; $R_1$ is phenyl, $R_2$ is COOH, and $R_3$ is hydrogen.

Embodiment A5: A compound of Embodiment A is disclosed; wherein X is oxygen; $R_1$ is phenyl, $R_2$ is hydrogen, and $R_3$ is benzyl.

Embodiment A6: A compound of Embodiment A is disclosed; wherein X is oxygen; $R_1$ is benzyl, $R_2$ is methyl, and $R_3$ is hydrogen.

Embodiment A7: A compound of Embodiment A is disclosed; wherein X is oxygen; $R_1$ is phenyl substituted with halogen (selected from F, Cl, Br, and I), $R_2$ is vinyl, and $R_3$ is methyl.

Embodiment A8: A compound of Embodiment A is disclosed; wherein X is oxygen; $R_1$ is 1-furan-2-yl, $R_2$ is acetamide, and $R_3$ is hydrogen.

Embodiment A9: A compound of Embodiment A is disclosed; wherein X is oxygen; $R_1$ is t-butyl, $R_2$ is isobutyl, and $R_3$ is hydrogen.

Embodiment A10: A compound of Embodiment A is disclosed; wherein X is oxygen; $R_1$ is vinyl, $R_2$ is 2-butyl, and $R_3$ is hydrogen.

Embodiment A11: A compound of Embodiment A is disclosed; wherein X is oxygen; $R_1$ is methoxyl, $R_2$ is methyl, and $R_3$ is butylamine.

Embodiment A12: A compound of Embodiment A is disclosed; wherein X is oxygen; $R_1$ is ethynyl, $R_2$ is 1H-Indol-3-yl, and $R_3$ is hydrogen.

Embodiment B: A Formula (I) compound is disclosed; wherein

X is $CH_2$;

$R_1$, $R_2$ or $R_3$ is independently selected from the group consisting of H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl and $C_1$-$C_{20}$ heteroaryl;

$R_1$, $R_2$ or $R_3$ is, independently, optionally substituted with one or more halogen, hydroxy, alkoxyl, CN, $N_3$, $N(R^a)(R^b)$, $C(O)N(R^a)(R^b)$, $N(R^a)C(O)N(R^b)(R^c)$, $N(R^a)C(O)OR^b$, $OC(O)N(R^a)(R^b)$, $C(O)OR^a$, $OC(O)OR^a$, $C(O)R^a$, $OC(O)R^a$, $S(O)_nR^a$, $S(O)_2N(R^a)(R^b)$ or $N(R^a)S(O)_2N(R^b)(R^c)$;

$R^a$, $R^b$ or $R^c$ is independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl; and n=1, 2, or 3.

Embodiment B1: A compound of Embodiment B is disclosed; wherein X is oxygen; $R_1$ is phenyl, both $R_2$ and $R_3$ are methyl. Embodiment B1 compound has the following structure.

Embodiment B2: A compound of Embodiment B is disclosed; wherein X is $CH_2$; $R_1$ is phenyl, $R_2$ is methyl, and $R_3$ is hydrogen.

Embodiment B3: A compound of Embodiment B is disclosed; wherein X is $CH_2$; $R_1$ is phenyl, $R_2$ is isopropyl, and $R_3$ is hydrogen.

Embodiment B4: A compound of Embodiment B is disclosed; wherein X is $CH_2$; $R_1$ is phenyl, $R_2$ is COOH, and $R_3$ is hydrogen.

Embodiment B5: A compound of Embodiment B is disclosed; wherein X is $CH_2$; $R_1$ is phenyl, $R_2$ is hydrogen, and $R_3$ is benzyl.

Embodiment B6: A compound of Embodiment B is disclosed; wherein X is $CH_2$; $R_1$ is benzyl, $R_2$ is methyl, and $R_3$ is hydrogen.

Embodiment B7: A compound of Embodiment B is disclosed; wherein X is $CH_2$; $R_1$ is phenyl substituted with halogen (selected from F, Cl, Br, and I), $R_2$ is vinyl, and $R_3$ is methyl.

Embodiment B8: A compound of Embodiment B is disclosed; wherein X is $CH_2$; $R_1$ is 1-furan-2-yl, $R_2$ is acetamide, and $R_3$ is hydrogen.

Embodiment B9: A compound of Embodiment B is disclosed; wherein X is $CH_2$; $R_1$ is t-butyl, $R_2$ is isobutyl, and $R_3$ is hydrogen.

Embodiment B10: A compound of Embodiment B is disclosed; wherein X is $CH_2$; $R_1$ is vinyl, $R_2$ is 2-butyl, and $R_3$ is hydrogen.

Embodiment B11: A compound of Embodiment B is disclosed; wherein X is $CH_2$; $R_1$ is methoxyl, $R_2$ is methyl, and $R_3$ is butylamine.

Embodiment B12: A compound of Embodiment B is disclosed; wherein X is $CH_2$; $R_1$ is ethynyl, $R_2$ is 1H-Indol-3-yl, and $R_3$ is hydrogen.

Without further elaboration, it is believed that one skilled in the art using the preceding description can utilize the present disclosure to its fullest extent. The following non-limiting Examples are illustrative of the disclosure. Steps in the following Examples illustrate a procedure for each step in an overall synthetic transformation, and the starting material for each step may not have necessarily been prepared by a particular preparative run whose procedure is described in other Examples or Steps. $^1$H NMR spectra are reported in ppm downfield from tetramethylsilane; "s" means singlet, "d" means doublet, "t" means triplet, "q" means quartet, "m" means multiplet, "dd" means doublet of doublets, "dt" means doublet of triplets, and "br s" means broad singlet.

Synthesis Example 1: Synthesis of Embodiment A1

(Embodiment A1)

Chemical Formula: $C_{30}H_{35}N_2O_8P$
Exact Mass: 582.2131
Molecular Weight: 512.5898

Embodiment A1 was prepared by following Scheme 1:

Phosphate A

Embodiment A1

To a solution of phosphodichloride (0.21 g, 1.00 mmol) in DCM was added L-Alanine methyl ester hydrochloride (0.14 g, 1.00 mmol) and TEA (0.20 g, 2 mmol) at −78° C. The reaction mixture was stirred at the same temperature for 1 hr, then the reaction mixture was slowly warmed to room temperature (RT) and stirred for overnight.

To the reaction mixture was added Naltrexone hydrochloride salt (0.37 g, 0.98 mmol) and TEA (0.15 g, 1.47 mmol) at RT and stirred for overnight. After reaction was completed, the solvent was removed under reduced pressure. The residual was diluted with EtOAc, washed with water and brine. The combined organic layers were dried over MgSO$_4$ and concentrated in vacuum. The crude product was purified via flash column chromatography on a silica gel column using 20:1 EtOAc-MeOH as the eluent. Embodiment A1 was obtained as a mixture of two diastereomers, yield 0.25 g (0.43 mmol).

(Diastereomer 1) $^1$H NMR (300 MHz, CDCl$_3$, δ): 7.35-7.32 (m, 5H), 7.26-7.24 (m, 1H), 7.13-7.08 (m, 1H), 6.68-6.65 (m, 1H), 4.76 (d, 1H), 4.59-4.51 (m, 1H), 4.26-4.20 (m, 1H), 3.68 (s, 3H), 3.21-3.20 (m, 1H), 3.08-3.00 (m, 1H), 2.73-2.66 (m, 2H), 2.43-2.42 (m, 2H), 2.36-2.30 (m, 1H), 2.17-2.06 (m, 1H), 1.94-1.92 (m, 1H), 1.67-1.59 (m, 3H), 1.37-1.35 (d, 3H), 0.89-0.80 (m, 2H), 0.60-0.54 (m, 4H).

(Diastereomer 2) $^1$H NMR (300 MHz, CDCl$_3$, δ): 7.30-7.25 (m, 5H), 7.18-7.14 (m, 1H), 7.02-6.99 (m, 1H), 6.64-6.61 (m, 1H), 4.75 (d, 1H), 4.40-4.33 (m, 1H), 4.20-4.08 (m, 1H), 3.65 (s, 3H), 3.11-3.08 (m, 1H), 3.08-3.00 (m, 1H), 2.63-2.56 (m, 2H), 2.42-2.40 (m, 2H), 2.30-2.26 (m, 1H), 2.17-2.06 (m, 1H), 1.92-1.90 (m, 1H), 1.59-1.50 (m, 3H), 1.17-1.14 (d, 3H), 0.89-0.80 (m, 2H), 0.17-0.15 (m, 4H)

ESI-MS m/z calcd for C$_{30}$H$_{35}$N$_2$O$_8$P 582.21, found 583.5 [M+H]$^+$.

Synthesis Example 2: Synthesis of Embodiment B1

(Embodiment B1)

Chemical Formula: C$_{31}$H$_{37}$N$_2$O$_7$P
Exact Mass: 580.23
Molecular Weight: 582.62

Embodiment B1 was prepared by following Scheme 2:

Phosphate A

Embodiment B1

To a solution of phosphodichloride (0.32 g, 1.50 mmol) in DCM was added L-Alanine methyl ester hydrochloride (0.21 g, 1.50 mmol) and TEA (0.30 g, 3 mmol) at −78° C. The reaction mixture was stirred at the same temperature for 1 hr, then the reaction mixture was slowly warmed to RT and stirred for overnight.

To the reaction mixture was added Nalmefene hydrochloride salt (0.45 g, 1.21 mmol) and TEA (0.23 g, 2.25 mmol) at RT and stirred for overnight. After reaction was completed, the solvent was removed under reduced pressure.

The residual was diluted with EtOAc, washed with water and brine. The combined organic layers were dried over MgSO$_4$ and concentrated in vacuum. The crude product was purified via flash column chromatography on a silica gel column using 20:1 EtOAc-MeOH as the eluent. Embodiment 2 was obtained as a mixture of two diastereomers, yield 0.35 g (0.60 mmol).

(Diastereomer 1) $^1$H NMR (400 MHz, CDCl$_3$, δ): 7.39-7.28 (m, 5H), 7.18-7.13 (m, 1H), 7.05-7.03 (m, 1H), 6.59 (d, 1H), 5.30-5.26 (m, 1H), 5.05 (s, 1H), 4.87-4.86 (d, 1H), 4.24-4.16 (m, 1H), 3.93-3.79 (m, 1H), 3.70 (s, 3H), 3.07-3.06 (m, 2H), 2.67-2.63 (m, 2H), 2.37 (d, 2H), 2.34-2.26 (m, 1H), 2.17-2.06 (m, 2H), 1.64-1.60 (m, 1H), 1.54-1.47 (m, 1H), 1.41-1.40 (d, 3H), 1.38-1.24 (m, 2H), 0.90-0.80 (m, 1H), 0.56-0.51 (m, 4H).

(Diastereomer 2) $^1$H NMR (400 MHz, CDCl$_3$, δ): 7.28-7.22 (m, 5H), 7.18-7.13 (m, 1H), 7.02-7.01 (m, 1H), 6.57 (d, 1H), 5.30-5.26 (m, 1H), 5.05 (s, 1H), 4.84-4.83 (d, 1H), 4.16-4.11 (m, 1H), 3.93-3.79 (m, 1H), 3.67 (s, 3H), 3.03-2.99 (m, 2H), 2.61-2.54 (dd, 2H), 2.35 (d, 2H), 2.34-2.26 (m, 1H), 2.17-2.06 (m, 2H), 1.64-1.60 (m, 1H), 1.54-1.47 (m, 1H), 1.37-1.35 (d, 3H), 1.38-1.24 (m, 2H), 0.90-0.80 (m, 1H), 0.15-0.11 (m, 4H).

ESI-MS m/z calcd for $C_{31}H_{37}N_2O_7P$ 580.23, found 581.6 $[M+H]^+$.

By adjusting the precursor of Scheme 1 or 2 (phosphodichloride and L-Alanine methyl ester hydrochloride), various compounds (includes but not limited to the aforesaid Embodiments) could be synthesized.

Pharmacokinetic Measurement in BALB/c Mice

This study tested the bioavailability of different test compounds in rats, by oral gavage administration, at prescribed dose levels.

Animal

Male BALB/c mice, body weight approximately 1925 g, were purchased from BioLASCO Taiwan Co., Ltd. and kept in the Animal Laboratory of Industrial Technology Research Institute. The animal room was maintained at a 12-h light and dark cycle controlled with constant temperature and humidity. The animals were given water and food ad-libtium. All procedures were performed according to the Guide for the Care and Use of Laboratory Animals (NRC, USA) and approved by the Institution Animal Care and Use Committee of Industrial Technology Research Institute.

Materials

1. Acetonitrile: J. T. Baker, Cat. No: 75-05-8; 2. Formic acid (FA): Sigma, Cat. No: 64-18-6; 3. DMSO: J. T. Baker, Cat. No. 75-05-8; 4. K$_2$EDTA: BD Microtainer, Code: REF365974; 5. Dulbecco's Phosphate Buffered Saline: Gibco, Code: 21600-010.

Methods

LC-MS/MS: ABSCIEX 4000 QTRAP LC-MS/MS System; Polarity: positive mode; Column: XBridge RP18, 3.5 µm, 4.6×20 mm; Flow rate: 0.7 mL/min; Injection volume: 10 µL; Temperature: Room temperature; Running time: 5 min. Bio Pulverizer: Biospec; Thermomixer Comfort: Eppendorf; Centrifuge 5424: Eppendorf.

The gradient elution program of mobile phase is recorded in Table 1.

TABLE 1

| Total time (min) | Flow rate (uL/min) | A% (0.1% TFA + H2O) | B% (0.1% FA Acetonitrile) |
|---|---|---|---|
| 0 | 700 | 90 | 10 |
| 0.5 | 700 | 90 | 10 |
| 1 | 700 | 10 | 90 |
| 3 | 700 | 10 | 90 |
| 4 | 700 | 90 | 10 |
| 5 | 700 | 90 | 10 |

Naltrexone and its Prodrugs (Embodiment A1) were administered to rats orally under the conditions described in Table 2. The detail of PK sample collection is also listed in Table 2.

TABLE 2

Test Article Dosing and PK Sample Collection

| | |
|---|---|
| Target for Bioanalysis | Groups 1: Naltrexone |
| | Groups 2: Prodrug |
| | (Embodiment A1) |
| Route(s) of Administration | PO |
| Dose Levels (mg/kg) | 20 mg/kg for a 20~25 g BALB/c |
| Dose Volume | 10 mL/kg |
| Proposed Formulation/Vehicle | 5% DMSO + 20% Cremophor EL ® + 0.9% NaCl |
| Number of Animals per Dosing Group | 3 |
| Total Number of Animals | 6 |
| Total Number of Samples | 42 plasma |
| Blood (PK Sample) Collection Time | 0, 0.25, 0.5, 1, 2, 4 and 24 h |
| Target Blood Sample Volume (mL) | No less than 40 uL by catheter |
| Preferred Anticoagulation | K$_2$-EDTA |
| Preferred Sample Storage | −80° C. |

Plasma Sample Collection from BALB/c Mice (Serial Sampling)

Blood aliquots (40 µL) were collected from jugular vein catheterized BALB/c in tubes coated with K$_2$-EDTA, mixed gently, then kept on ice and centrifuged at 7000×g for 15 minutes at 4° C. The plasma was then harvested and kept frozen at −80° C. until further processing.

Quantitative Bioanalysis (Plasma)

The plasma samples were processed using acetonitrile precipitation and analyzed by LC-MS/MS. A plasma calibration curve was generated. Aliquots of drug-free plasma were spiked with the test compound at the specified concentration levels.

The spiked plasma samples were processed together with the unknown plasma samples using the same procedure. The processed plasma samples were stored at −80° C. until the LC-MS/MS analysis, at which time peak areas were recorded, and the concentrations of the test compound in the unknown plasma samples were determined using the respective calibration curve. The reportable linear range of the assay was determined, along with the lower limit of quantitation (LOQ).

Pharmacokinetics

Plots of plasma concentration of compound versus time were constructed. The fundamental pharmacokinetic parameters of compound after PO dosing ($T_{max}$, $C_{max}$ and $AUC_{last}$) were obtained from the non-compartmental analysis (NCA) of the plasma data using WinNonlin.

The pharmacokinetic parameters of parent compound Naltrexone, prodrug (Embodiment A1) and Naltrexone released from the prodrug were measured and listed in Table 3.

TABLE 3

| Compound | | $T_{max}$ (h) | $C_{max}$ (ng/mL) | $AUC_{last}$ (h * ng/mL) | $MRT_{last}$ (h) |
|---|---|---|---|---|---|
| Naltrexone | Mean | 0.13 | 277.67 | 235.56 | 0.63 |
| | SD | 0.18 | 108.87 | 126.69 | 0.16 |
| Prodrug (Embodiment A1) | Mean | 0.33 | 8.45 | 20.02 | 4.90 |
| | SD | 0.14 | 3.54 | 12.89 | 4.10 |
| Naltrexone from Prodrug | Mean | 0.25 | 125.53 | 131.91 | 3.86 |
| | SD | 0.00 | 36.59 | 40.44 | 3.07 |

Figure 1:
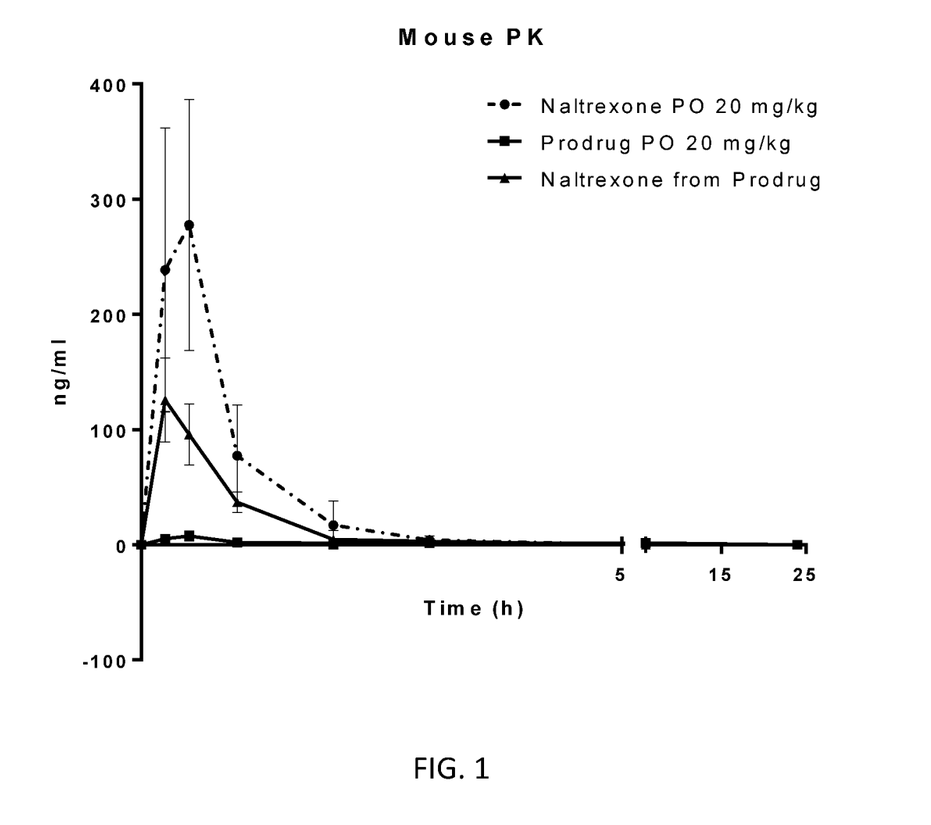
FIG. 1 shows the record of the concentration change of naltrexone, prodrug of the present disclosure (Embodiment A1) and naltrexone released from the prodrug in blood with respect to time in a mice study.
Figure 2:
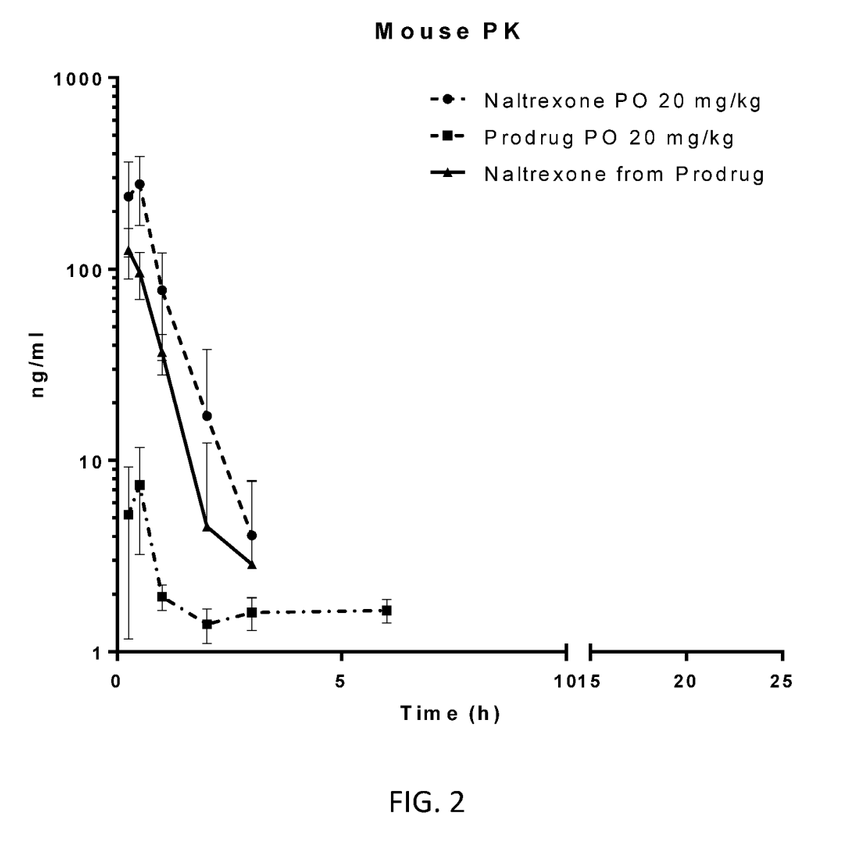
FIG. 2 illustrates the same record as FIG. 1 but displays on log scale.

FIG. 1 shows the record of the concentration change of naltrexone, prodrug of the present disclosure (Embodiment A1) and naltrexone released from the prodrug in blood with respect to time in a mice study. FIG. 2 plots the blood concentration change on log scale. According to the PK data showed in Table 3 above and FIGS. 1 and 2, it was noted that the concentration of Naltrexone (parent compound) in blood raised rapidly and reached the highest level after oral administration comparing with prodrug and Naltrexone from prodrug.

As are demonstrated in the table and the figures, the concentration of Naltrexone from prodrug in plasma raised relatively slowly and lower in magnitude indicating that the structure of the present disclosure effectively controlled the release of Naltrexone in plasma. In other words, taking the advantage of the structure of the present disclosure, phenomena of abrupt absorption occurred to Naltrexone in plasma can be alleviated.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A compound according to formula (II), or a pharmaceutically acceptable salt, prodrug or solvate thereof:

(II)

wherein:
A has the following structure:

X is $CH_2$ or oxygen;
$R_1$, $R_2$ or $R_3$ is independently selected from the group consisting of H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl and $C_1$-$C_{20}$ heteroaryl;

$R_1$, $R_2$ or $R_3$ is, independently, optionally substituted with one or more halogen, hydroxy, alkoxyl, CN, $N_3$, $N(R^a)(R^b)$, $C(O)N(R^a)(R^b)$, $N(R^a)C(O)N(R^b)(R^c)$, $N(R^a)C(O)OR^b$, $OC(O)N(R^a)(R^b)$, $C(O)OR^a$, $OC(O)OR^a$, $C(O)R^a$, $OC(O)R^a$, $S(O)_nR^a$, $S(O)_2N(R^a)(R^b)$ or $N(R^a)S(O)_2N(R^b)(R^c)$;

$R^a$, $R^b$ or $R^c$ is independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl;

n=1, 2, or 3;

$R_4$ is H, methyl, allyl, or cyclopropyl methyl; and $R_5$ is H or OH.

2. The compound according to claim 1, wherein $R_1$ is selected from the group consisting of $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl.

3. The compound according to claim 1, wherein $R_2$ or $R_3$ is independently selected from the group consisting of $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl.

4. The compound according to claim 1, wherein $R_1$ is phenyl, $R_2$ is methyl and $R_3$ is methyl.

5. The compound according to claim 1, wherein X is $CH_2$.

6. The compound according to claim 1, wherein X is oxygen.

7. A compound according to formula (I), or a geometric isomer, enantiomer, diastereomer, racemate, atropisomer, pharmaceutically acceptable salt, prodrug or solvate thereof:

(I)

wherein:
X is $CH_2$ or oxygen;
$R_1$, $R_2$ or $R_3$ is independently selected from the group consisting of H, $C_1$-$C_{20}$ alkyl, $C_2$-$C_{20}$ alkenyl, $C_2$-$C_{20}$ alkynyl, $C_3$-$C_{20}$ carbocyclyl, $C_6$-$C_{20}$ aryl, $C_1$-$C_{20}$ heterocyclyl and $C_1$-$C_{20}$ heteroaryl;

$R_1$, $R_2$ or $R_3$ is, independently, optionally substituted with one or more halogen, hydroxy, alkoxyl, CN, $N_3$, $N(R^a)$ ($R^b$), C(O)N($R^a$)($R^b$), N($R^a$)C(O)N($R^b$)($R^c$), N($R^a$)C(O)O$R^b$, OC(O)N($R^a$)($R^b$), C(O)O$R^a$, OC(O)O$R^a$, C(O)$R^a$, OC(O)$R^a$, S(O)$_n R^a$, S(O)$_2$N($R^a$)($R^b$) or N($R^a$)S(O)$_2$N($R^b$)(R');

$R^a$, $R^b$ or $R^c$ is independently selected from the group consisting of H, oxygen, $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl; and n=1, 2, or 3.

8. The compound according to claim 7, wherein $R_1$ is selected from the group consisting of $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl.

9. The compound according to claim 7, wherein $R_2$ or $R_3$ is independently selected from the group consisting of $C_1$-$C_{10}$ alkyl, $C_2$-$C_8$ alkenyl, $C_2$-$C_8$ alkynyl, $C_3$-$C_8$ carbocyclyl, $C_6$-$C_{20}$ aryl, $C_1$-$C_{20}$ heterocyclyl and $C_1$-$C_{20}$ heteroaryl.

10. The compound according to claim 7, wherein $R_1$ is phenyl, $R_2$ is methyl and $R_3$ is methyl.

11. The compound according to claim 7, wherein X is $CH_2$.

12. The compound according to claim 7, wherein X is oxygen.

13. The compound according to claim 7, wherein the compound has the following structure:

14. A pharmaceutical composition comprising the compounds of claim 1 and at least one pharmaceutically acceptable carrier or excipient.

15. The pharmaceutical composition according to claim 14, wherein the pharmaceutically acceptable carrier is an aqueous carrier.

16. A pharmaceutical composition comprising the compounds of claim 7 and at least one pharmaceutically acceptable carrier or excipient.

* * * * *